US012809196B2

(12) United States Patent
Chua et al.

(10) Patent No.: US 12,809,196 B2
(45) Date of Patent: Nov. 24, 2026

(54) OPTICALLY ACTIVATED OBJECT MASS TRANSFER SYSTEM

(71) Applicant: Genesee Valley Innovations, LLC, Santa Clara, CA (US)

(72) Inventors: Christopher L. Chua, San Jose, CA (US); Ching-Fuh Lin, Palo Alto, CA (US); Zhihong Yang, Palo Alto, CA (US); Max Batres, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 1004 days.

(21) Appl. No.: 17/875,620

(22) Filed: Jul. 28, 2022

(65) Prior Publication Data

US 2024/0036364 A1 Feb. 1, 2024

(51) Int. Cl.
*G02F 1/01* (2006.01)

(52) U.S. Cl.
CPC .................................. *G02F 1/0147* (2013.01)

(58) Field of Classification Search
CPC ..................................................... G02F 1/0147
See application file for complete search history.

(56) References Cited

U.S. PATENT DOCUMENTS 7,195,687 B2 3/2007 Hayashi et al.
9,412,727 B2 8/2016 Menard et al.
9,496,155 B2 11/2016 Menard
10,964,582 B2 * 3/2021 Wang ..................... H10H 20/01
11,302,561 B2 4/2022 Wang et al.
2003/0022403 A1 1/2003 Shimoda et al.
2005/0155699 A1 7/2005 Hayashi et al.
2013/0130440 A1 5/2013 Hu
2013/0210194 A1 8/2013 Bibl
2015/0344755 A1 12/2015 Schneider
2017/0215280 A1 7/2017 Chaji
2017/0358478 A1 * 12/2017 Thothadri ........... H01L 25/0753
2020/0402831 A1 12/2020 Wang
2024/0036364 A1 2/2024 Chua
2024/0038574 A1 2/2024 Chua

OTHER PUBLICATIONS

U.S. Appl. No. 17/875,729; Notice of Allowance issued May 6, 2026; 12 pages.

* cited by examiner

*Primary Examiner* — John Bedtelyon
(74) *Attorney, Agent, or Firm* — Mueting Raasch Group

(57) ABSTRACT

A transfer system includes a transfer layer formed of a thermally switchable material that undergoes a phase change when heated. A side of the transfer layer is placed in contact with an outward-facing side of a chiplet during a transfer operation. An optical absorber material is located on at least one of the outward facing side of the chiplet or an inward facing side of the chiplet. An optical energy source is operable to apply optical energy to the optical absorber material through the transfer layer to selectively heat a region of the transfer layer that corresponds to a location of the chiplet. The region holds the chiplet when the optical energy is removed during the transfer operation. The region is subsequently heated during the transfer operation to release the chiplet.

16 Claims, 12 Drawing Sheets

OPTICALLY ACTIVATED OBJECT MASS TRANSFER SYSTEM

SUMMARY

The present disclosure is directed to transfer layer with optically-activated, repeatable, and reversible rigid-to-soft transitions to facilitate object (e.g., chiplet) mass transfer. In one embodiment, a transfer system includes a transfer layer formed of a thermally switchable material that undergoes a phase change when heated. A side of the transfer layer is placed in contact with an outward-facing side of a chiplet during a transfer operation. An optical absorber material is located on at least one of the outward facing side of the chiplet or an inward facing side of the chiplet. An optical energy source is operable to apply optical energy to the optical absorber material through the transfer layer to selectively heat a region of the transfer layer that corresponds to a location of the chiplet. The region holds the chiplet when the optical energy is removed during the transfer operation. The region is subsequently heated during the transfer operation to release the chiplet. The transfer layer is reusable for repeated transfer operations.

In another embodiment, a method involves causing a transfer layer of a transfer head to contact a chiplet at a first side of the transfer layer. Optical energy is applied to selectively heat an optical absorber material on the chiplet causing heating in a region of the transfer layer corresponding to a location of the chiplet. The transfer layer is formed of a thermally switchable material that undergoes a phase change when heated resulting in the region of the transfer layer conforming to the chiplet. The optical energy is removed to cause the transfer layer to hold the chiplet. The transfer head is moved relative to a donor substrate or surface to move the chiplet. The region of the transfer layer is subsequently heated to release the chiplet. The transfer layer is reusable for repeated transfer operations.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
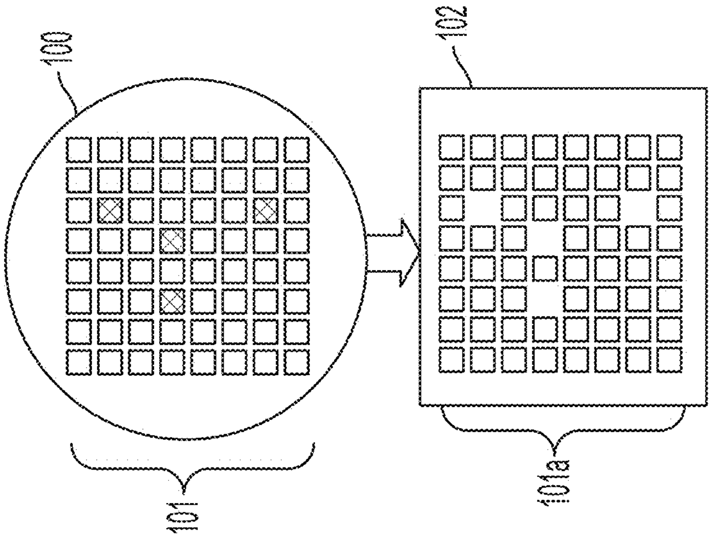
FIGS. 1 and 2 are block diagrams showing an assembly process according to an example embodiment.

The present disclosure relates to manipulation and assembly of objects, and in some embodiments the mass assembly of micro-objects via a transfer substrate. Some electronic devices are fabricated by mechanically overlaying small objects on top of each other. While micro-electronic and micro-optical components are sometimes manufactured using wafer formation techniques such as layer deposition, masking, and etching, certain classes of materials are not growth-compatible with each other. In such a case, the assembly may involve forming one class of devices on a first substrate and a second class of devices on a second substrate, and then mechanically joining them, e.g., via flip-chip or transfer printing techniques.

Aspects described herein relate to a system that is capable of transferring large number of micro objects (e.g., particles, chiplets, mini/micro-LED dies) from a donor substrate to another substrate in parallel while maintaining high position registration of the individual micro objects. This system allows selectively transferring of micro objects from a donor substrate and selectively placing the micro objects to the destination or target substrate. This system may be used for assembling devices such as microLED displays.

Generally, microLED displays are made with arrays of microscopic LEDs forming the individual transfer elements. Both OLED displays and microLED displays offer greatly reduced energy requirements compared to conventional LCD systems. Unlike OLED, microLED is based on conventional LED technology, which offers higher total brightness than OLED produces, as well as higher efficiency in terms of light emitted per unit of power. It also does not suffer from the shorter lifetimes of OLED.

A single 4K television utilizing microLED has ~25 million small LED subpixels that need to be assembled. Mass transfer of chiplets is one technology that may be used for microLED manufacturing. Transferring microLED to a target backplane quickly and accurately with a high yield will be one of the techniques that manufacturers need to perfect in order for microLED to be a viable mass-market product.

The techniques described below can be used for microLED manufacture, as well as other assembly procedures in which a large number of (typically) small objects need to be moved at once, and where it may be necessary to selectively move a subset of such device to and/or from the transfer media. Such micro objects may include but not limited to inks, pre-deposited metal films, silicon chips, integrated circuit chips, beads, microLED dies, lasers, waveguides, photonic components, micro-electro-mechanical system (MEMS) structures, and any other pre-fabricated microstructures. In the present disclosure, these objects may be collectively referred to as "chiplets" in that they are small, individually separable devices or structures amenable to selective mass-transfer from a source to a target.

Being able to selectively transfer chiplets in an arbitrary pattern is useful to facilitate the effective transfer process, pixel repair, hole/vacancy refill for microLED display manufacturing, which will lead to high process yield. An elastomer stamp has been used to deterministically transfer microscale LED chips for this type of application. However, an elastomer stamp has fixed pattern and cannot transfer arbitrary pattern of chiplets. Inevitably, some subset of the chiplets will be defective, and therefore it becomes difficult to replace a select few of them using such a stamp.

Figure 2:
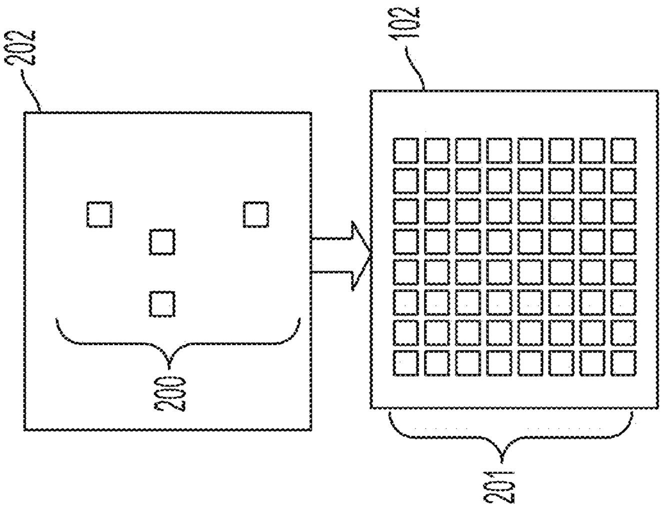

In FIGS. 1 and 2, block diagrams show an example of an assembly process that can be achieved using devices, systems, and methods according to example embodiments. In FIG. 1, a donor wafer/substrate 100 is shown that includes an array of chiplets 101 that may have been grown or placed on the substrate or surface 100. The shaded chiplets in the array 101 have been identified as defective, and when the chiplets are transferred to a target substrate 102, only a subset 101*a* of the chiplet array are transferred, namely the good chiplets that are not shaded. This may be achieved with a transfer head 202 as shown in FIG. 2 that can selectively pick up just the subset 101*a* from the donor substrate 100 once they are identified. As shown in FIG. 2, the transfer head 202 can subsequently pick up a second set of chiplets 200 (e.g., from a different donor substrate). The locations of the chiplets within the set 200 correspond to the locations of the defective chiplets on the first donor substrate 100. The transfer head 202 moves this set 200 to the target substrate 102, resulting in a full set 201 of operational chiplets being located on the target substrate 102.

The present disclosure relates to, among other things, a transfer head with a transfer layer that can be activated at predetermined locations to selectively hold and transfer an array of micro objects on a substrate, or subset thereof. In the latter case, even when the whole transfer layer is in contact with the array of micro objects, only the subset will adhere to the transfer head and be transferred, and the objects outside the subset will be left behind or otherwise unaffected. Similarly, the transfer layer may be able to selectively release a subset of micro objects that are currently attached to the transfer layer, such that only the part of the held objects are released. The transfer layer may non-selectively release the subset as well, e.g., release all chiplets currently held regardless of position. The activation process is repeatable and reversible, such that no permanent bonding or sacrificial material is needed to affect the selective holding or releasing of the objects.

Figure 3:
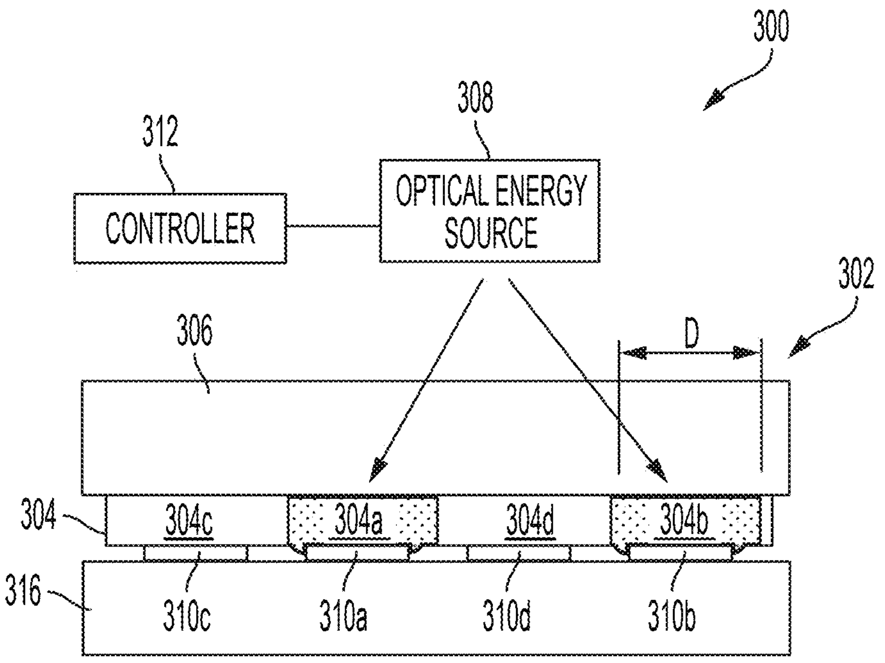
FIGS. 3 and 4 are side views of an apparatus showing part of a transfer operation according to an example embodiment.
Figure 4:
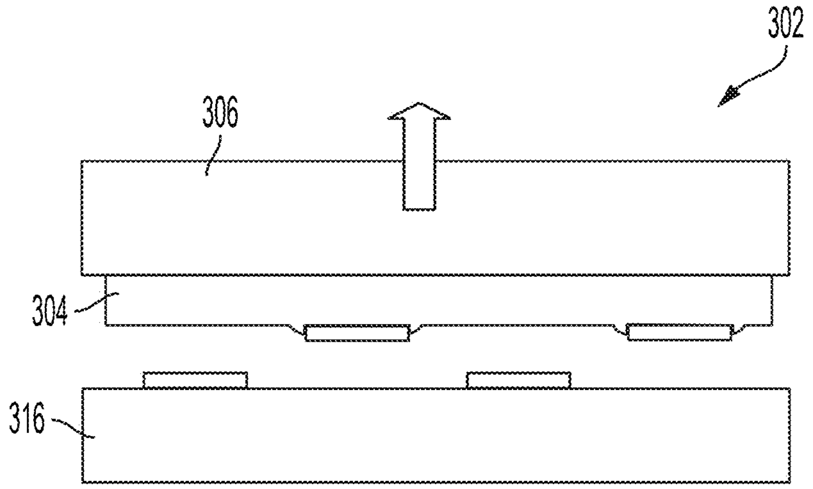

In FIGS. 3 and 4, side views illustrate details of an apparatus 300 according to an example embodiment. As seen in FIG. 3, the apparatus includes a transfer head 302 with a transfer layer 304 formed on a base structure or substrate 306. Portions of the transfer layer 304 can selectively be made to change stiffness via the application and removal of heat to a localized region. The change in mechanical properties of the transfer layer 304 may also be referred to herein as a phase change, e.g., from a solid state to a gelatinous/liquid state.

For example, the stiffness can be expressed as the Young's modulus of the material from which the transfer layer 304 are made. The Young's modulus is a measure of stress (force per unit area) divided by strain (proportional deformation) in a material in the linear elasticity regime. Generally, materials with higher Young's modulus (lower strain for a stress a) is stiffer than a material with lower Young's modules (higher strain for the same a). Other measures may also be used to represent stiffness of a material, such as storage modulus, which also accounts for dynamic performance of the material. Some measures may be used to represent stiffness of a part, such as a spring constant, that may be functionally equivalent in defining performance of the part. However the stiffness is described, the transfer layer 304 can experience a change in stiffness in response to temperature that can be utilized in device transfer as described below.

The transfer layer 304 has a higher Young's modulus (e.g., >6 MPa) at a lower temperature and a lower Young's modulus (e.g., <1 MPa) at a higher temperature. An optical energy source 308 (e.g., a laser) operable to change a temperature of the regions of the transfer layer in response to an input from a controller 312. In this case, the optical energy source is coupled to heat portions 304*a*, 304*b* of the transfer layer 304 (the heating indicated by shading), while portions 304*c* and 304*d* are not heated. This example illustrates how the transfer layer 304 can selectively pick up a subset of objects 310*a*, 310*b* from a source substrate 316 while leaving a second subset of objects 310*c*, 310*d* attached to the source substrate 316.

The heated portions 304*a*, 304*b* can deform around the objects 310*a*, 310*b* during the heating, and when the optical energy is removed, then the portions 304*a*, 304*b* re-solidify holding on the objects 310*a*, 310*b*. When the transfer head 302 is moved away from the source substrate 316 as shown in FIG. 4, objects 310*a*, 310*b* will be pulled from the source substrate 316 while objects 310*c*, 310*d* remain on the source substrate 316. When the transfer head 302 is moved over and in contact with a target substrate/backplane (not shown), the portions 304*a*, 304*b* are reheated either via the optical energy source 308 or a different energy source allowing the objects 310*a*, 310*b* to be released onto the target substrate, which may have means for holding, adhering to, or attracting the objects 310*a*, 310*b* to ensure separation from the transfer head 302. Note that in the release phase, the entire transfer layer 304 may be heated and not just portions 304*a*, 304*b*, assuming that all currently attached chiplets are to be released.

The apparatus 300 may be part of a micro-transfer system, which is a system used to transfer micro-objects (e.g., 1 μm to 1 mm) from the source substrate 316 to a target substrate. The transfer layer 304 may be formed of a multi-polymer that contains stearyl acrylate-based (SA). In such a case, a difference between the higher and lower temperatures may be less than 20° C. (or in other cases less than 50° C.) in order to adjust the tackiness of the transfer layer 304 such that there is a marked difference in Young's modulus, e.g., from <1 MPa at the higher temperature to >6 MPa at the lower temperature. The controller 312 in such a system may be coupled to actuators (not shown) that induce relative motion between the transfer head 302 and substrates to facilitate object transfer as described herein.

Generally, the transfer layer 304 forms an intermediate transfer surface whose compliance can be modulated (e.g., have a sharp rigid-to-soft transition) as a function of temperature. Such a surface can be used to pick up and release groups of micro-objects in a controlled and selectable manner. The optical energy source 308 may be optically coupled to mirrors, lenses, waveguides, and the like to selectively create hotspots on the transfer layer 304. The controller 312 can switch the optical energy source 308 off and on so that only selected regions are heated. The exposure spot size may have diameter D from sub-micrometers to several hundreds of micrometers and may be adjustable via optics and power inputs to the optical energy source 308. The pitch of the exposure spots may vary from sub-micrometers to several millimeters. The base structure 306 may be formed of a transparent material at the wavelengths used by the optical energy source 308, such as glass, quartz, silicon, polymer and silicon carbide (SiC). The base structure 306 may have a thickness that ranges from several tens of microns to several millimeters and lateral dimensions from several millimeters to one meter.

Phase-changing polymer comprising stearyl acrylate (SA) has been studied as a bistable electroactive polymer (BSEP) for use in the transfer layer. The BSEP polymer is a rigid polymer below its glass transition temperature (Tg). Above Tg, it becomes an elastomer that exhibits large elongation at break and high dielectric field strength. Electrical actuation can be carried out above Tg with the rubbery BSEP functioning as a dielectric elastomer. The deformation is locked when cooling down the polymer below Tg. The shape change can be reversed when the polymer is reheated above Tg.

Stearyl acrylate (octadecyl acrylate, SA) based polymers have been investigated as shape memory polymers due to their sharp phase transition between the crystalline and molten states of the stearyl moieties. The abrupt and reversible phase transition of the crystalline aggregates of the stearyl moieties results in a rapid shift between the rigid and rubbery states of the polymers during temperature cycles. The transition of SA is typically below 50° C. with a narrow phase change temperature range of less than 20° C. Therefore, SA is an ideal component for imparting a sharp rigid-to-rubbery transition.

The transfer layer 304 may be made of materials including but not limited to stearyl acrylate (octadecyl acrylate, SA) based polymers, stearyl acrylate and urethane diacrylate copolymer or other types of polymers. In particular, a copolymer containing urethane diacrylate and SA has been found to have desirable characteristics for these purposes. The transfer layer 304 preferably has a sharp rigid-to-soft transition therefore the adhesion can be easily modulated with temperature change.

The transfer layer materials described above are transparent at laser wavelengths commonly used in mass assembly systems, e.g., green and blue lasers. Thus, when using lasers of these wavelengths, the transfer layer 304 may not be directly heat-able by the optical energy source 308 but can instead be heated by an optical absorber applied to some or all of the chiplets 310*a-d*.

Figure 5:
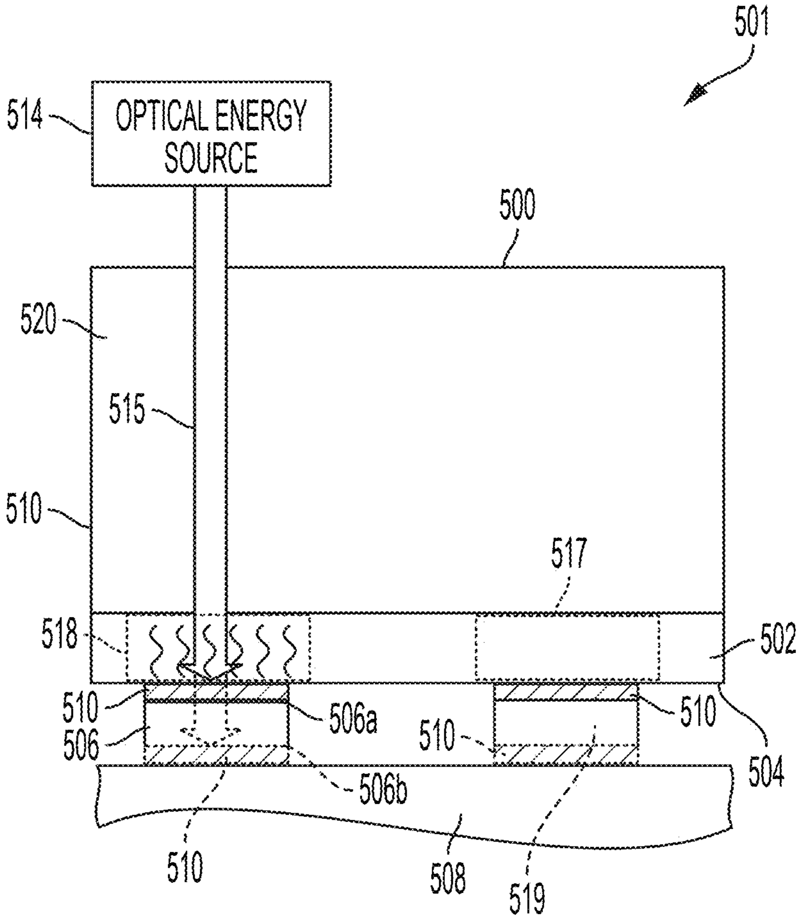
FIGS. 5 and 6 are side views of transfer heads according to various embodiments.
Figure 6:
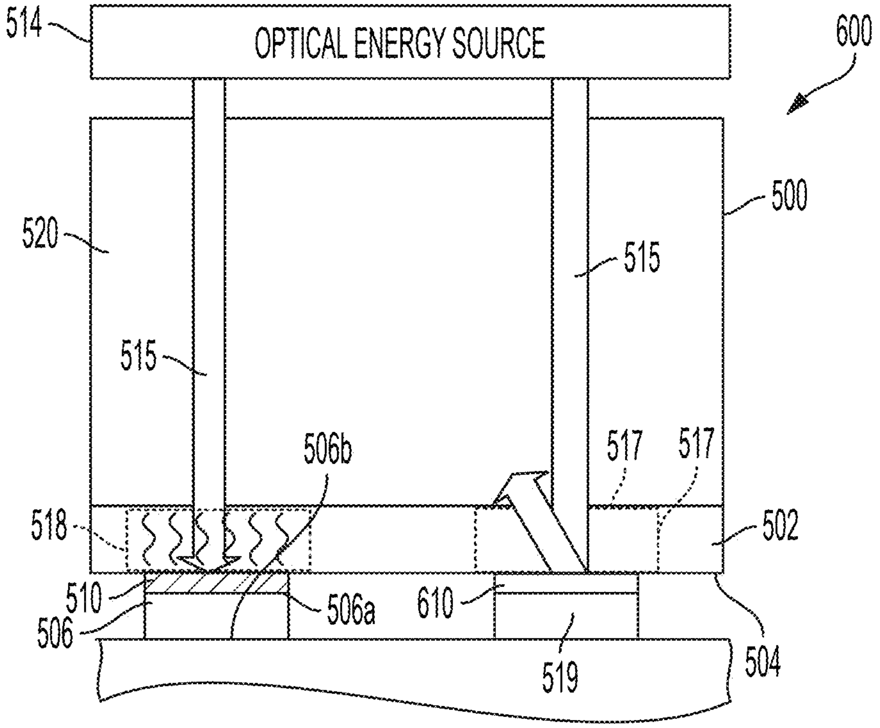

In FIGS. 5 and 6, diagrams show an example of an optical absorber that can be used in a system 501 according to an example embodiment. The system 501 includes a transfer head 500 with a transfer layer 502 formed of a thermally switchable material that undergoes a phase change when heated. A side 504 of the transfer layer 502 is placed in contact with a chiplet 506 during a transfer operation. The transfer operation may include, for example, selectively removing the chiplet 506 from a source substrate or surface 508 (also referred to herein as a donor substrate or surface), moving the chiplet 506 to a target substrate or surface (not shown), and releasing the chiplet 506 onto the target substrate or surface. The chiplet 506 can be any microscale object, a large number of such objects being typically arrayed on the source substrate or surface 508.

An optical absorber material 510 is located on at least one of an outward facing side 506*a* of the chiplet 506 or an inward facing side 506*b* of the chiplet 506. An optical energy source 514 is operable to apply optical energy 515 (e.g., a scanned laser beam) to the optical absorber material 510 through the transfer layer 502 to selectively heat a region 518 of the transfer layer 502 that corresponds to a location of the chiplet 506. The region 518 holds the chiplet when the optical energy 515 is removed during the transfer operation, e.g., after a phase change in region 518 has caused the switchable material to conform to and grip the chiplet 506. The transfer layer 502 is held and supported by a base structure such as a substrate 520. The substrate 520 may be transparent at the wavelength of the optical energy 515, or may have other features (e.g., voids) that allow the optical energy 515 to pass to the optical absorber material 510.

Note that while the optical absorber material 510 may be applied to both sides 506*a*, 506*b* of the chiplet 506, just the inward facing side 506*b* may be used where the chiplet 506 is transparent at the wavelength of the optical energy 515, and just the outward facing side 506*a* may be used where the chiplet 506 is non-transparent at the wavelength of the optical energy 515. Also, while the optical absorber material 510 is shown as separate from the chiplet 506, it may be integrally formed as part of the chiplet 506, e.g., outer packaging, passivation layer, conductive pad, contact electrode, etc. In other cases, the optical absorber material 510 may be added post-manufacturing, e.g., as a patterned, non-uniform layer applied via transfer printing, mechanically placed, sputtered or sprayed on, etc. Also note that where the optical absorber material 510 is on the inward facing side 506*b*, it may be integrated with or formed on the source substrate or surface 508.

Removal of the optical energy 515 causes the switchable material to harden in while gripping the chiplet 506, such that when the transfer head 500 is pulled away from the source substrate or surface 508, the chiplet 506 is released. Note that a nearby chiplet 519 also has the optical absorber material 510 applied in a similar manner to chiplet 506. During this part of the transfer operation, if no optical energy was previously applied to another region 517 of a nearby chiplet 519, this chiplet 519 will remain on the source substrate or surface 508 when the transfer head 500 is pulled away from the source substrate or surface 508 (or the source substrate or surface 508 is pulled away from the transfer head 500).

After removal of the targeted chiplet 506 from the source substrate or surface 508, the transfer head 500 can then be moved to the target substrate or surface where the chiplet 506 is placed. The associated region 518 can be subsequently heated via the optical absorber material 510 (or by some other means) to release the chiplet 506 during this release part the transfer operation, allowing the target chiplet 506 to be transferred to the target substrate or surface. The selectable holding and releasing of the chiplet 506 by the transfer layer 502 can be repeated for multiple chiplets during multiple operations. Note that during the release part of the transfer operation, selective heating of the transfer layer 502 may not be needed since all chiplets currently on the transfer head 500 may be released at once. In such case, the entire transfer layer may be heated, e.g., via non-selective application of the optical energy or alternate means. The selective or non-selective subsequent means for releasing chiplets include laser irradiation, optical exposure, infrared lamp heating, electrical joule heating, inductive heating, RF heating, hot plate heating, conductive heating, convection heating, forced air, or a combination of different means.

Because all of the chiplets 506, 519 in FIG. 5 have the optical absorber material 510 similarly applied, the selective heating is achieved by only applying the optical energy 515 to the targeted chiplet 506. As will be described in detail below, this can be achieved by way of a scanning optical system in which one or more laser beams or other energy sources scan a beam across the chiplets and the energy is selectively applied or removed such that only targeted parts of the transfer layer are heated by this selective illumination.

This arrangement offers good tolerance to laser exposure alignment, since only objects being picked absorb light and produce heat. Light outside of the objects being picked passes through the switchable material of the transfer layer and does not contribute to heat generation near the transfer layer surface. If the objects being picked are optically transparent, such as GaN LEDs and λ=1065 nm laser light, the absorbing material can be at the object's surface opposite the switchable material. Laser light would interact with the absorbing material after passing through the object. If the object is intrinsically absorbing, such as silicon and λ=445 nm light, no additional absorbing materials are needed.

In FIG. 6, an alternate embodiment of a system 600 is shown in which selective application of the optical absorber material 510 is used to achieve selective heating instead of selective application of the optical energy 515. As seen in FIG. 6, the optical absorber material 510 is applied to the outward facing side/surface 506*a* of the chiplet 506, although the concept still applies if the optical absorber material 510 is instead or in addition applied to the inward facing side/surface 506*b* of the chiplet 506. The chiplet 519 that is not targeted for removal has either no optical absorber material applied or has an optical non-absorbing material 610 applied, e.g., a reflective material or transparent material. In the former case, the outward facing surface of the chiplet 519 may be already optically reflective, or the chiplet 519 may be transparent at the wavelength of the optical energy 515.

The optical non-absorbing material 610 can be formed/applied in a similar manner as the optical absorber material 510 is formed/applied. In this example both materials 510, 610 are shown being applied to outward facing surfaces of the chiplets. In other embodiments, e.g., where the chiplets 506, 519 are transparent, the optical absorber material 510 can exist or be applied on all of the inward facing surfaces of the chiplets, and a reflective optical non-absorbing material 610 is applied on the outward surfaces of only those chiplets which are not targeted for removal.

The optical absorber material 510 described above can be one of or a combination of metal, carbon, and semiconductor, e.g., applied as a thin film to the chiplet. The optical absorber material may be a full absorber in one or more embodiments, such as carbon (broad spectrum) or silicon (at wavelengths below 1.1 μm), partially reflecting such as metal (e.g., Ni or Pt), partially absorbing, or absorbing at select wavelengths such as optical band pass filters. A semiconductor optical absorber material may include at least one of silicon, amorphous silicon, polysilicon, and TiN. A metallic optical absorber material may include one of or a combination of Pt, Ni, Ti, Cr, Mo, and Cu.

Figure 7:
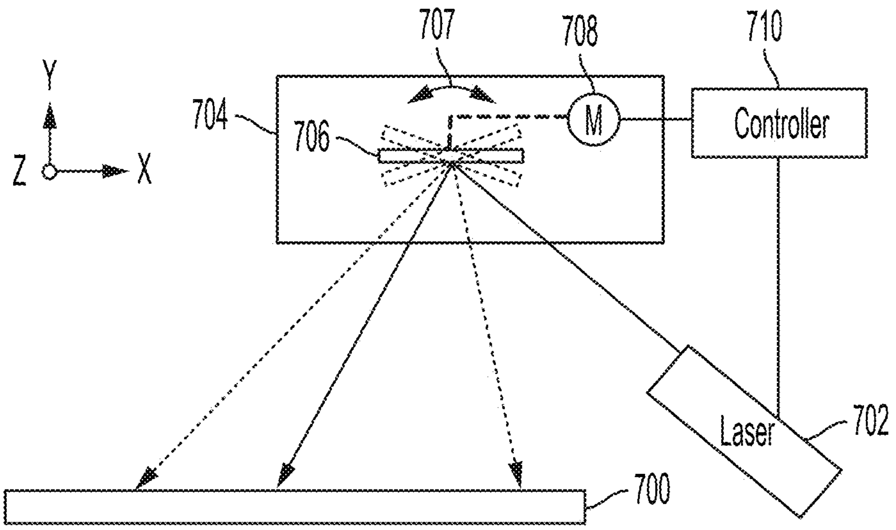
FIG. 7 is a diagram of an optical scanner used for selective heating of a transfer head according to example embodiments.

As noted above, the laser or other optical energy source can selectively heat parts of the transfer layer. In FIG. 7, a block diagram shows an example configuration of a heating subsystem using an optical scanner according to one or more embodiments. In this figure, a transfer layer 700 is part of a transfer head (not shown) as described elsewhere, and an optical absorber layer may also be used with the transfer layer but is omitted here for purposes of clarity. An optical energy source (e.g., laser 702) and scanning optics 704 may be integrated with the transfer head or located externally to the transfer head. In this example, the scanning optics 704 includes at least one or more movable mirrors 706 and one or more motors 708. Other components may be included in the scanning optics, such as lenses, polarizers, collimators, etc.

The movable mirror 706 is shown rotating as indicated by the arrow 707. A single axis rotation such as the illustrated z-axis rotation can facilitate scanning along a single row of a rectangular matrix of chiplets located below the transfer layer 700. The mirror 706 and motor 708 can also be configured to rotate about a second axis, e.g., the z-axis, to scan an adjacent row. A second mirror and motor (not shown) may also be used to affect a change in rows. In other embodiments, the mirror 706 and motor 708 could be configured to rotate about the y-axis, thereby resulting in a polar coordinate pattern being illuminated. Translations of mirrors may also be used instead of or in addition to the rotations described above.

One or more controllers 710 are coupled to the one or more motors 708 and facilitates precise movement of the mirror 706, e.g., via servo control. The controller(s) 710 also control output of the laser 702, such that a spot on the transfer layer 700 is illuminated or not-illuminated based on whether heating is desired at a current location at which the laser beam is aimed. This can be achieved by turning the laser 702 off and on, activating a shutter that blocks or redirects light emitted from the laser, etc. The configuration shown in FIG. 7 can be extended to use more than one laser and/or optical scanner.

As noted above, selective heating of the transfer layer facilitates picking up a subset of chiplets or other objects from a donor surface/substrate while leaving other chiplets/objects behind. Once this subset of chiplets is moved to the target surface/substrate, it may often be the case that all of the subset of chiplets will be released at the same time. Thus the entire transfer layer can be heated in order to achieve this. While an optical energy source can be used that illuminates the entire transfer layer (and associated optical absorber material, if used), in other cases, a less complicated or less expensive, full surface heating means may be used for the release stage of the transfer operation.

Figure 8:
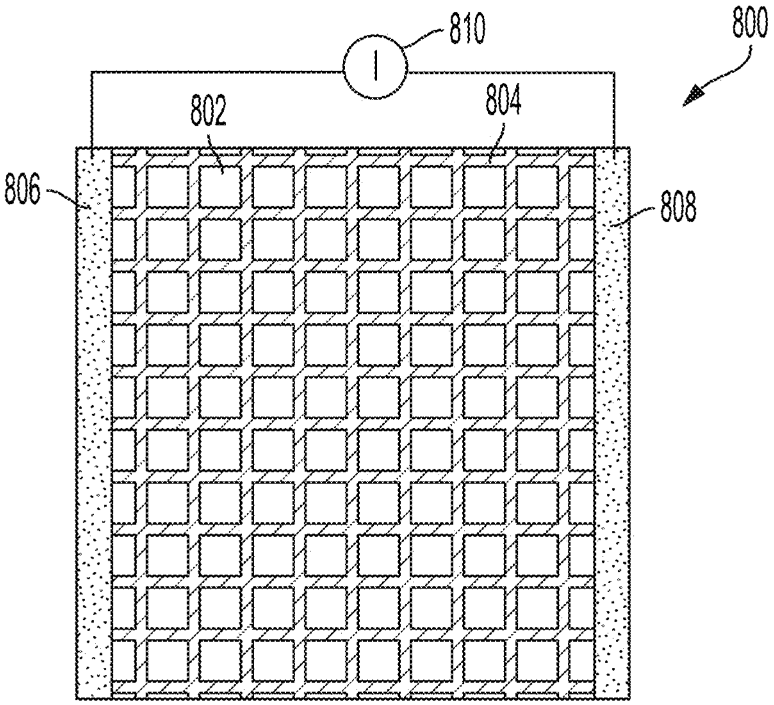
FIGS. 8, 9, and 10 are views showing non-selective heating arrangements for a transfer head according to example embodiments.

In FIG. 8, a plan view shows a non-selective heating arrangement for a transfer head 800 according to an example embodiment. The transfer head 800 includes a transfer layer 802 and a conductive mesh 804 in contact with the transfer layer 802. The conductive mesh 804 may be transparent at the wavelength of the heating laser or may have a geometry that does not interfere with heating of the chiplets through the transfer layer 802. The conductive mesh 804 may be a conductive grid of wires or other structures overlaid on the transfer layer 802. The conductive mesh 804 may be formed of a metal, metal oxide, or other electrically conductive material (e.g., carbon).

Electrodes 806, 808 are electrically coupled to opposing edges of the conductive mesh 804. An electrical current can be applied to the electrodes 806, 808, e.g., by current source 810, such that the electrical current flows across the conductive mesh 804, which generates heat due to electrical resistance of the conductive mesh 804. This heat is transferred to the transfer layer 802, which softens at higher temperatures and allows any chiplets attached to the transfer layer 802 to be released.

Figure 9:
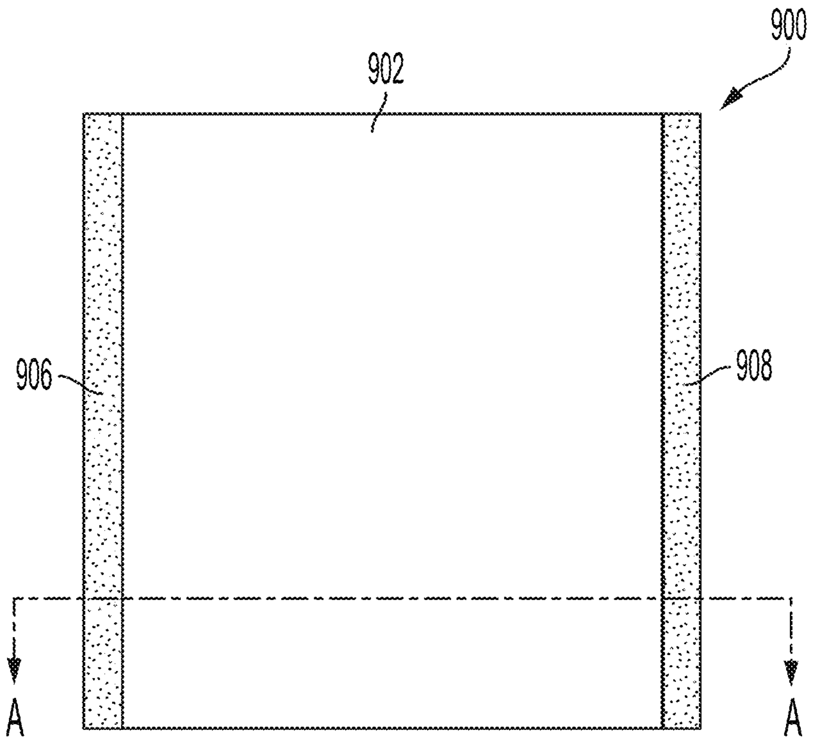
Figure 10:
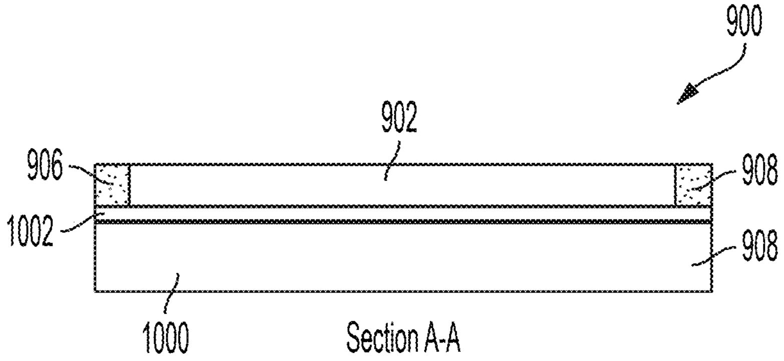

In FIGS. 9 and 10, plan and cross-sectional views show a non-selective heating arrangement for a transfer head 900 according to another example embodiment. The transfer head 900 includes a transfer layer 902 formed of a switchable material. Electrodes 906, 908 are electrically coupled to opposing edges of the transfer head 900. As seen in FIG. 10, a conductive layer 1002 is shown placed between the transfer layer 902 and a base structure 1000 (e.g., transparent substrate). A current applied to the electrodes 906, 908 causes current to flow across the conductive layer 1002, which generates heat due to electrical resistance of the conductive layer 1002. This heat is transferred to the transfer layer 902, which softens at higher temperatures and allows any chiplets attached to the transfer layer 902 to be released. The conductive layer 1002 may be formed of an optically transparent conductor such as at least one of indium tin oxide (ITO), zinc oxide (ZnO), fluorine doped tin oxide, conductive polymers, carbon nanotubes, or graphene.

It may be frequently desirable to perform a thermal cycle between transfer operations to recondition the transfer layer and to smooth out surface features formed on transfer layer during the previous operation. This involves, for example, heating and cooling the transfer layer above and below Tg one or more times while no objects are attached to the transfer layer. Any of the selective or non-selective heating arrangements described above can be used for this thermal cycling.

Figure 11:
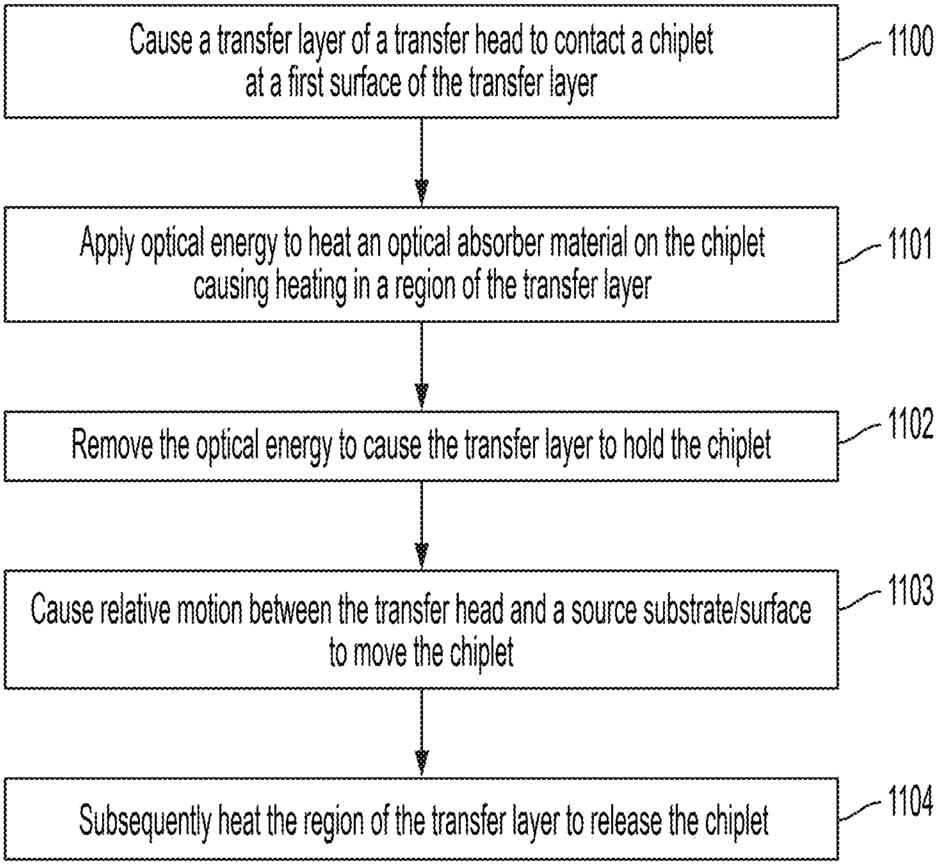
FIG. 11 is a flowchart of a method according to an example embodiment.

In FIG. 11, a flowchart shows a method according to an example embodiment. The method involves causing a transfer layer of a transfer head to contact 1100 a chiplet at a first surface of the transfer layer. This may involve moving one or both of the transfer head and a donor substrate on which the chiplet is located. Optical energy is applied 1101 to heat an optical absorber material on the chiplet causing heating in a region of the transfer layer corresponding to a location of the chiplet. The transfer layer is formed of a thermally switchable material that undergoes a phase change when heated resulting in the region of the transfer layer conforming to the chiplet. The optical energy is removed 1102 to cause the transfer layer to hold the chiplet. The transfer head is moved 1103 relative to a donor substrate or surface to move the chiplet, which may involve moving one or both of the transfer head and the donor substrate to initially remove the chiplet from the substrate. The region of the transfer layer is subsequently heated 1104 to release the chiplet. The holding and releasing of the chiplet by the transfer layer is repeatable and reversible such that the transfer layer is reusable for repeated transfer operations.

Figure 12:
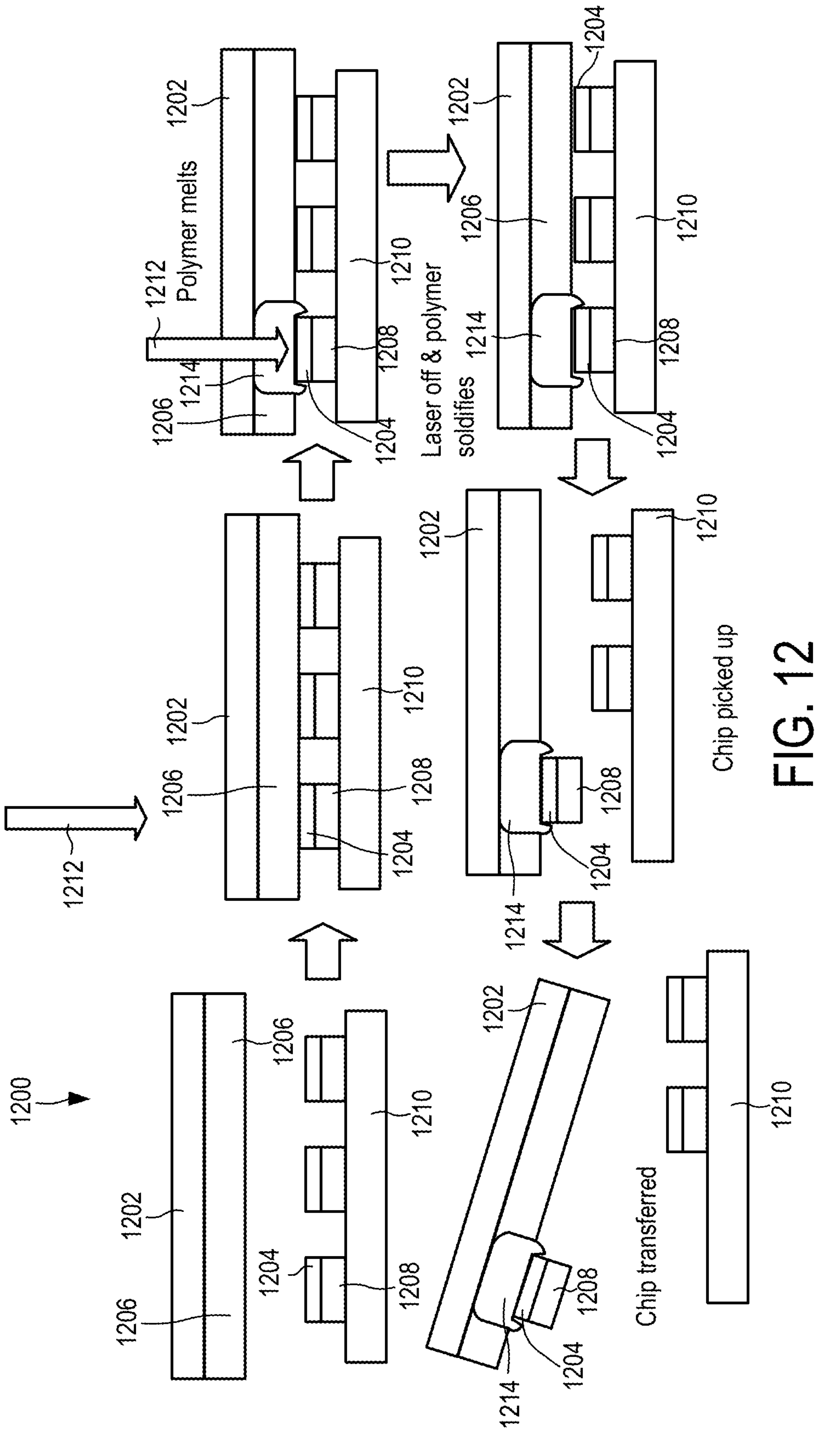
FIG. 12 is a diagram of part of a transfer operation according to an example embodiment.

To test the concept, an embodiment was experimentally evaluated that used Pt on the surface of 50 μm-size chips and conducted laser activated chip pick-up experiments. Platinum was chosen for this example because it is convenient to deposit and exhibits high absorption at the chosen laser wavelength (λ=445 nm). In FIG. 12, a diagram shows an illustration of the laser activation process performed during the experiments. Generally, a transfer system 1200 includes a transfer head with a base support layer 1202 (e.g., glass) and a transfer layer 1206. An optical absorber material 1204 is shown on an outward facing surface of a set of chiplets 1208 on a donor substrate 1210. In the upper left of the figure, the transfer head 1200 is positioned over chiplets 1208. Next, optical energy 1212 is applied to one of the chiplets 1208, resulting in a region 1214 of the transfer layer 1206 melting as seen in the upper right. This region 1214 cools allowing the chiplets 1208 to be lifted off as shown in the bottom of the figure, from right to left.

Figure 13:
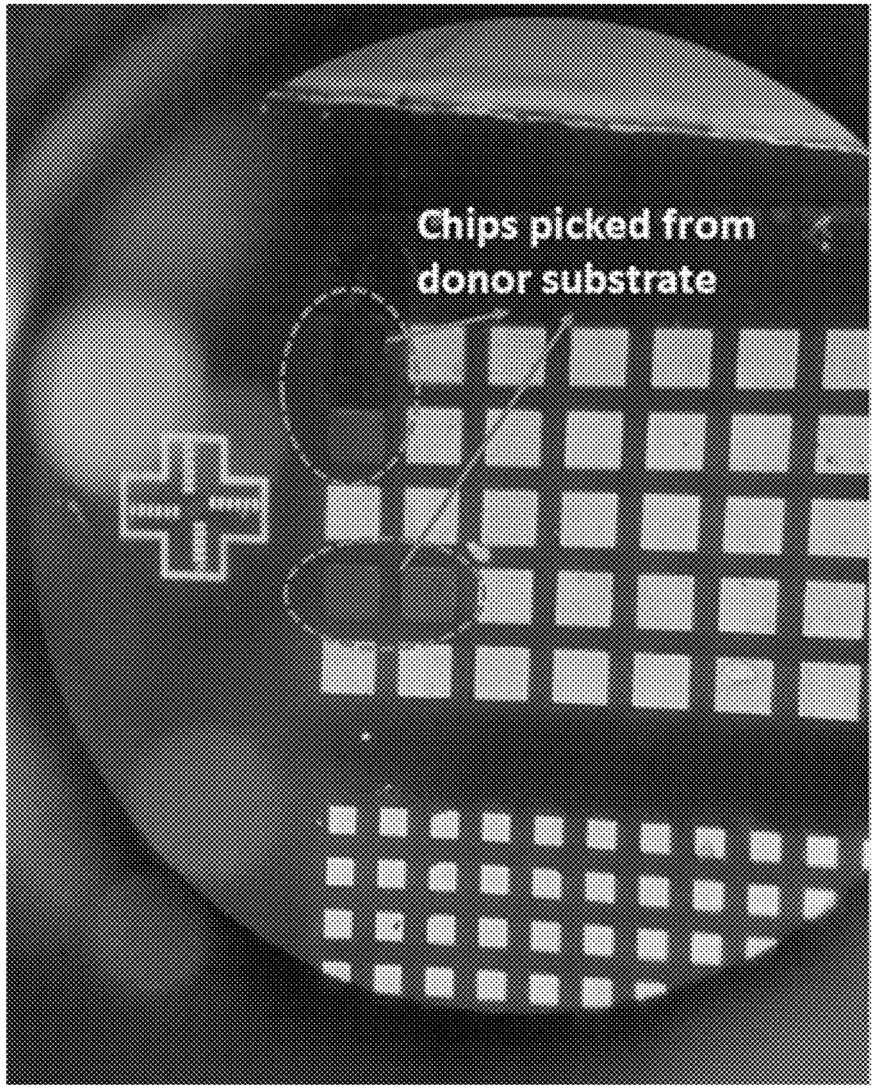
FIGS. 13 and 14 are optical micrograph images showing experimental results using a transfer system according to an example embodiment.
Figure 14:
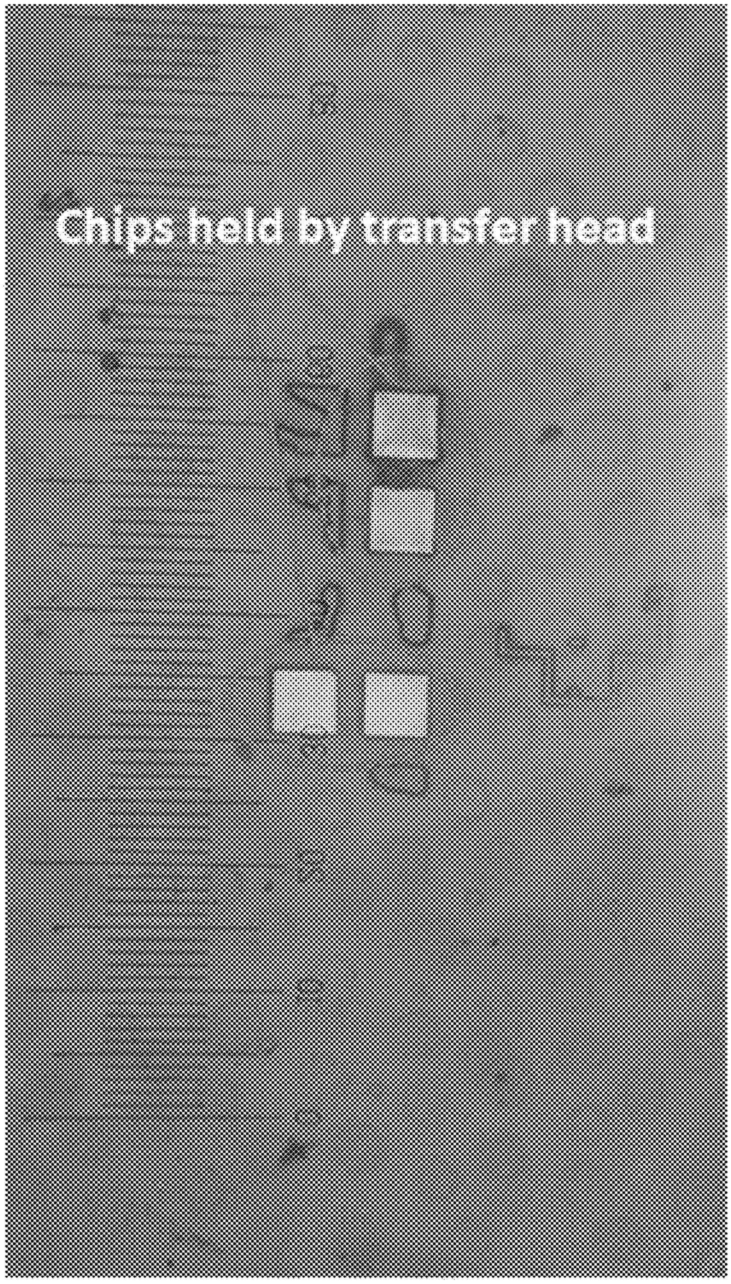

In FIGS. 13 and 14, optical micrograph images show successful die pick-up at regions exposed to laser light using a system as shown in FIG. 12. The image in FIG. 13 shows Pt-coated chips picked up from donor substrate at laser-exposed regions. The image in FIG. 14 shows the chips being held on the transfer head.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A transfer system, comprising:

a transfer layer formed of a thermally switchable material that undergoes a phase change when heated, a side of the transfer layer being placed in contact with an outward-facing side of a chiplet during a transfer operation;

an optical absorber material on at least one of the outward facing side of the chiplet or an inward facing side of the chiplet; and an optical energy source operable to apply optical energy to the optical absorber material through the transfer layer to selectively heat a region of the transfer layer that corresponds to a location of the chiplet, the region holding the chiplet when the optical energy is removed during the transfer operation, the region being subsequently heated during the transfer operation to release the chiplet, wherein the transfer layer is reusable for repeated transfer operations.

2. The transfer system of claim 1, wherein the optical absorber material is a thin film applied to the outward facing side or inward facing side of the chiplet.

3. The transfer system of claim 2, wherein the chiplet is optically transparent at a wavelength of the optical energy, and wherein the thin film is applied at the inward facing side of the chiplet.

4. The transfer system of claim 1, wherein a portion of the chiplet is formed of the optical absorber material.

5. The transfer system of claim 1, wherein the optical absorber material comprises one of or a combination of metal, carbon, and semiconductor.

6. The transfer system of claim 1, wherein the optical absorber material is a patterned, non-uniform layer.

7. The transfer system of claim 1, wherein the optical absorber material is integral with electrical contacts of the chiplet.

8. The transfer system of claim 1, further comprising:

an optically transparent conductive layer in thermal contact with the transfer layer; and two or more electrodes coupled to pass an electrical current across the optically transparent conductive layer, the electrical current heating the transparent conductive layer to non-selectively perform the subsequent heating of the transfer layer.

9. The transfer system of claim 1, further comprising:

a conductive mesh in thermal contact with the transfer layer; and two or more electrodes coupled to pass an electrical current across the conductive mesh, the electrical current heating the conductive mesh to non-selectively perform the subsequent heating of the transfer layer.

10. The transfer system of claim 1, wherein the thermally switchable material comprises a shaped memory polymer.

11. The transfer system of claim 10 wherein the shaped memory polymer comprises stearyl acrylate.

12. The transfer system of claim 1, wherein the optical energy source is a scanned laser beam.

13. The transfer system of claim 1, wherein the subsequent heating is performed by optical exposure, laser irradiation, infrared lamp heating, electrical joule heating, inductive heating, radio-frequency heating, hot plate heating, conductive heating, convection heating, forced air, or a combination thereof.

14. The transfer system of claim 1, wherein the transfer layer contacts a second chiplet that is not proximate the heated region of the transfer layer, the second chiplet not being held by the transfer layer during the transfer operation.

15. The transfer system of claim 14, wherein the second chiplet does not include the optical absorber material, and wherein the optical energy is applied to the second chiplet during the transfer operation.

16. The transfer system of claim 14, wherein the second chiplet includes the optical absorber material on at least one of a second outward facing side of the chiplet or a second inward facing side of the second chiplet, and wherein the optical energy is not applied to the second chiplet during the transfer operation.

* * * * *